(12) United States Patent
Wurthner et al.

(10) Patent No.: US 8,744,739 B2
(45) Date of Patent: Jun. 3, 2014

(54) METHOD FOR INITIALIZING THE MASS OF A MOTOR VEHICLE

(75) Inventors: Maik Wurthner, Markdorf (DE); Peter Herter, Ravensburg (DE); Ingo Sauter, Meckenbeuren (DE); Joachim Staudinger, Ravensburg (DE); Johannes Kemler, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 174 days.

(21) Appl. No.: 13/501,931

(22) PCT Filed: Oct. 11, 2010

(86) PCT No.: PCT/EP2010/065156
§ 371 (c)(1),
(2), (4) Date: Apr. 18, 2012

(87) PCT Pub. No.: WO2011/054622
PCT Pub. Date: May 12, 2011

(65) Prior Publication Data
US 2012/0209503 A1     Aug. 16, 2012

(30) Foreign Application Priority Data

Nov. 3, 2009 (DE) .................. 10 2009 046 344

(51) Int. Cl.
*G06F 17/10* (2006.01)

(52) U.S. Cl.
USPC .............................. 701/124; 701/51

(58) Field of Classification Search
USPC .............. 701/124, 1, 29, 51, 64–65, 173–175
See application file for complete search history.

(56) References Cited

U.S. PATENT DOCUMENTS

| 7,979,185 B2 | 7/2011 | Wolfgang et al. |
| 2009/0192664 A1* | 7/2009 | Wolfgang et al. ............... 701/29 |
| 2010/0108406 A1* | 5/2010 | Wuerthner et al. ........... 177/136 |

FOREIGN PATENT DOCUMENTS

| DE | 103 47 187 A1 | 5/2005 |
| DE | 10 2006 022 171 A1 | 11/2007 |
| WO | 2008/119616 A1 | 10/2008 |

* cited by examiner

*Primary Examiner* — Thomas Black
*Assistant Examiner* — Luke Huynh
(74) *Attorney, Agent, or Firm* — Davis & Bujold, PLLC; Michael J. Bujold

(57) ABSTRACT

A method of initializing the mass of a motor vehicle after a restart, for controlling a starting process of the motor vehicle a from a standstill. During operation of the motor vehicle, its mass is computed and the determined mass values are stored and, from the stored mass values, a vehicle-specific maximum mass value and/or a vehicle-specific minimum mass value is determined. The vehicle-specific maximum mass value and/or the vehicle-specific minimum mass value, determined in this manner, is subsequently used for initializing the mass of the motor vehicle after restarting the vehicle.

17 Claims, 2 Drawing Sheets

METHOD FOR INITIALIZING THE MASS OF A MOTOR VEHICLE

This application is a National Stage completion of PCT/EP2010/065156 filed Oct. 11, 2010, which claims priority from German patent application serial no. 10 2009 046 344.5 filed Nov. 3, 2009.

FIELD OF THE INVENTION

The invention concerns a method for initializing the mass of a motor vehicle after it has been restarted, for the control of a starting process from standstill of the motor vehicle.

BACKGROUND OF THE INVENTION

For the optimum control of a starting process of a motor vehicle from standstill thereof, the mass of the motor vehicle must be known. This is particularly important with motor vehicles whose vehicle mass varies markedly, for example utility vehicles such as trucks. Only when the vehicle mass of the motor vehicle is known can a starting gear be selected correctly. Furthermore, if the vehicle mass is known, a starting clutch connected between the transmission and the drive aggregate can be controlled with precision.

Since motor vehicles such as utility vehicles do not as a rule have sensors with the help of which the vehicle's mass can be determined by direct measurement, the vehicle's mass has to be determined by computation. Thus, from DE 10 2006 022 171 A1 a method is known, with the help of which, during operation, i.e. while driving, the mass of the motor vehicle is calculated. However, such a method can only be used while driving.

Since after a motor vehicle, for example a truck, has come to rest, its mass as a rule changes due to loading and/or unloading, the mass of the motor vehicle computed in accordance with the method of DE 10 2006 022 171 A1 cannot be used for a starting process from standstill of the vehicle after restarting it. Rather, to control a starting process from standstill of the motor vehicle after it has been restarted, mass initialization values are used, namely a minimum mass value and a maximum mass value which are independent of the motor vehicle concerned.

In the methods known from the prior art, as the minimum mass value for initializing the mass of a motor vehicle after it is restarted, the unloaded weight without trailer, i.e. the mass of an unloaded tractor machine is used. On the other hand, as the maximum mass value for initializing the mass after restarting the vehicle, the mass of the motor vehicle when it is carrying its maximum permitted load is used. This procedure for initializing the mass of a motor vehicle after restarting it is inexact, so a starting gear can only be selected inaccurately. Moreover, the starting clutch can only be controlled imprecisely.

SUMMARY OF THE INVENTION

Starting from there, the present invention addresses the problem of providing a more accurate method for initializing the mass of a motor vehicle after restarting it, for the control of a starting process from standstill of the motor vehicle. This problem is solved by a method according to the invention with which, during the operation of the motor vehicle its mass is computed, mass values thus calculated are stored, and from the stored mass values a vehicle-specific maximum mass value and/or a vehicle-specific minimum mass value are determined, the vehicle-specific maximum mass value and/or the vehicle-specific minimum mass value of the motor vehicle then being used for initializing the vehicle's mass after restarting it.

With the method according to the invention, to initialize the mass of a motor vehicle after restarting the vehicle it is proposed to carry out the initialization on the basis of stored mass values. Thus, it is proposed to store mass values computed during the operation of the motor vehicle and to determine, from these stored mass values, a vehicle-specific maximum mass value and/or a vehicle-specific minimum mass value for mass initialization.

The vehicle-specific maximum mass value and/or the vehicle-specific minimum mass value so determined are used for initializing the mass of the motor vehicle when it is restarted.

The invention is based on the recognition that most motor vehicles do not use to the full the theoretically possible, available mass range between the unloaded tractor machine and the maximum permissible loading. Thus, many motor vehicles have a fixed superstructure, for example a tank, whose mass cannot be taken into account for determining the vehicle-specific minimum mass value. Furthermore, with regard to the transport material typically loaded, in particular its specific weight, the maximum permissible loading is not used as a rule. This can be taken into account in the determination of the vehicle-specific maximum mass value.

By virtue of the vehicle-specific determination of a maximum mass value and a minimum mass value for initializing the mass when the motor vehicle is restarted, the starting process can be controlled more accurately since on the one hand a starting gear can be selected more accurately and on the other hand the starting clutch can be controlled more precisely. By more accurate determination of the starting gear, gearshifts on starting off are avoided, which on the one hand reduces wear and on the other hand increases driving comfort. Also, thanks to the more precise control of the starting clutch, again wear is reduced and driving comfort is improved.

The invention makes it possible for the first time to match the initialization of the mass after a restart of a motor vehicle, individually to the motor vehicle itself, namely to its typical field of use. This cannot be done by the transmission manufacturer, since such details are not known to the manufacturer.

According to an advantageous further development of the invention, from the stored mass values a vehicle-specific loading pattern or a vehicle-specific unloading pattern for the motor vehicle is determined, and the vehicle-specific maximum mass value and/or the vehicle-specific minimum mass value is determined on the basis of the vehicle-specific loading or unloading pattern determined.

With this advantageous further development the starting process can be controlled even more precisely, since still more accurate initialization of the mass of the motor vehicle after restarting it is made possible by a more exact estimation of the maximum and minimum mass values.

BRIEF DESCRIPTION OF THE DRAWINGS

Preferred further developments of the invention emerge from the description given below. An example embodiment of the invention, to which it is not limited, is described in greater detail with reference to the drawings, which show.

DETAILED DESCRIPTION OF THE PREFERRED EMBODIMENTS

The present invention concerns a method for initializing the mass of a motor vehicle, in particular the mass of a utility vehicle whose mass varies markedly, for example the mass of a utility vehicle used as a garbage collection truck or a milk delivery truck or heating oil transporter, after a restart thereof.

With the method according to the invention, an exact initialization of the mass after restarting the motor vehicle is made possible, so that after the motor vehicle has been restarted, on the basis of the mass initialization carried out according to the invention a starting process from standstill of the motor vehicle can be controlled with precision by means of a transmission control unit.

Before going in detail into the invention with reference to FIGS. 2 and 3, below the prior art will be described with reference to FIG. 1.

Figure 1:
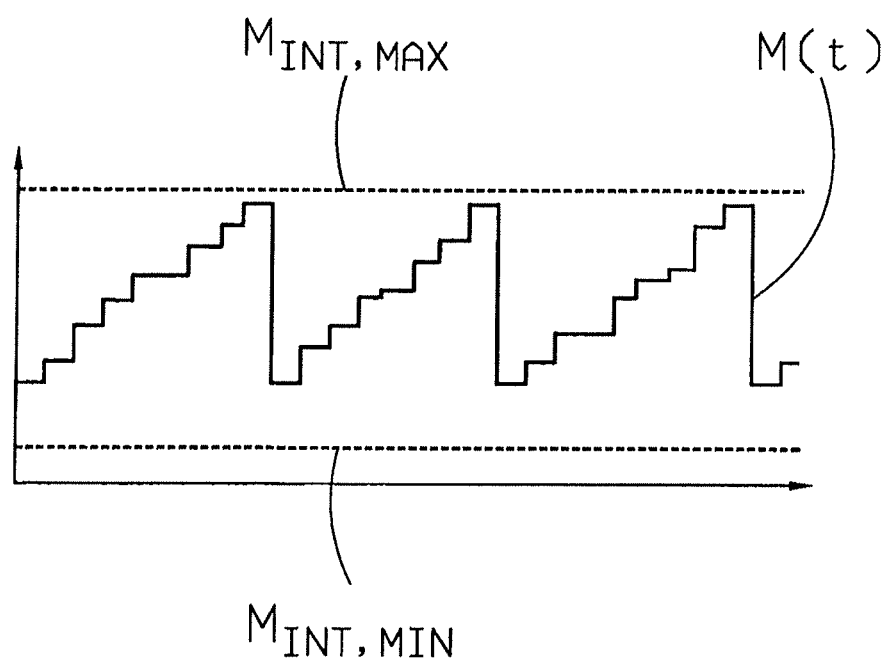
FIG. 1: A diagram to make clear the prior art.

Thus, as a function of time t during the operation of a motor vehicle, namely a truck serving as a garbage collection truck or milk delivery truck, FIG. 1 shows determined mass values M(t) of the motor vehicle computed during its operation, for example by means of the method known from DE 10 2006 022 171 A1. For example, for the case of a garbage collection truck or a milk delivery truck FIG. 1 shows that its mass M(t) during operation typically increases in steps up to an upper limit value, and after this has been reached, the mass decreases again as the milk delivery truck or garbage collection truck is emptied.

According to the prior art, to initialize the mass of a motor vehicle after restarting it, the procedure adopted is, that as the minimum mass value $M_{INT,MIN}$ for mass initialization, the mass of the empty traction machine is used, and as the maximum mass value $M_{INT,MAX}$) the maximum permissible overall mass of the truck is used. In this case it can be seen from FIG. 1 that according to the prior art, the minimum mass value $M_{INT,MIN}$ is always substantially lower than the computed minimum mass (minimum of the calculated vehicle masses M(t)) and the maximum mass value $M_{INT,MAX}$ for mass initialization is always substantially higher than the computed maximum mass (maximum of the calculated vehicle mass M(t)).

From this it follows that according to the prior art the initialization of the motor vehicle's mass after a restart is inaccurate, so that a starting process of the motor vehicle from standstill after restarting can also take place only imprecisely.

Figure 2:
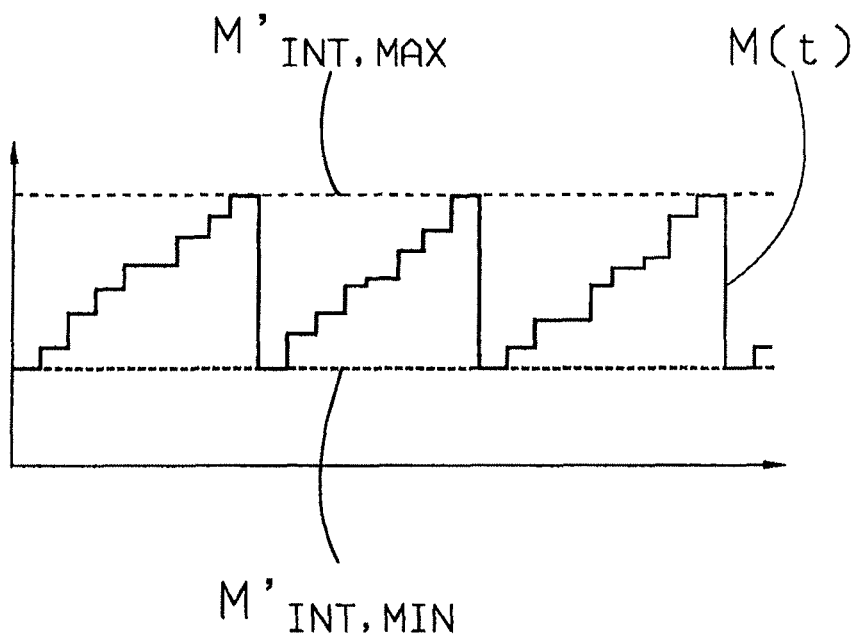
FIG. 2: A diagram to make clear a first example embodiment of the method according to the invention for initializing the mass of a motor vehicle.

FIG. 2 shows that according to the present invention, to initialize the mass of a motor vehicle after it is restarted, the procedure adopted is that from the mass values M(t) computed during the operation of the motor vehicle, which are stored during operation, a vehicle-specific maximum mass value $M'_{INT,MAX}$ and a vehicle-specific minimum mass value $M'_{INT,MIN}$ are determined and the vehicle-specific maximum mass value $M'_{INT,MAX}$ and the vehicle-specific minimum mass value $M'_{INT,MIN}$ so determined are used for mass initialization of the motor vehicle after it is restarted.

The invention is based on the recognition that a motor vehicle, namely a truck whose mass varies markedly, will typically always be used for the same purpose and thus neither the mass of the empty traction machine nor the mass when carrying the maximum permissible load have to be taken into account as possible masses during operation. Thus, according to the invention the maximum mass value and the minimum mass value for mass initialization after restarting the motor vehicle are adapted on the basis of mass values determined and stored during the actual operation of the motor vehicle. This makes it possible to control the starting process more precisely, since on the one hand a starting gear can be determined more exactly and on the other hand a starting clutch can be controlled with greater precision.

In the determination of the vehicle-specific maximum mass value $M'_{INT,MIN}$ for mass initialization, rarely encountered maximum mass values are not taken into account since they are filtered out.

Likewise, in the determination of the vehicle-specific minimum mass value $M'_{INT,MIN}$ for mass initialization, rarely encountered minimum mass values are filtered out so as not to be taken into account.

In this way it can be ensured that only rarely encountered mass values, which represent an unusual, rarely encountered loading situation of the motor vehicle or which result from calculation errors, are not taken into account for the mass initialization after restarting.

In an advantageous further development of the invention, for the determination of the vehicle-specific maximum mass value $M'_{INT,MAX}$ and for that of the vehicle-specific minimum mass value $M'_{INT,MIN}$, in the sense of a digital storage ring system a defined number of stored mass values computed during the operation of the motor vehicle are taken into account, so that when a new mass value of the motor vehicle is calculated and stored in the ring storage system, the oldest mass value in it is deleted from the ring storage system. This enables on-going, quasi-continuous updating of the vehicle-specific maximum mass value $M'_{INT,MIN}$ and of the vehicle-specific minimum mass value $M'_{INT,MIN}$ for the initialization of the motor vehicle' mass.

Otherwise, it is also possible for the determination of the vehicle-specific maximum mass value $M'_{INT,MAX}$ and for that of the vehicle-specific minimum mass value $M'_{INT,MIN}$, to take into account a defined number of mass values determined and stored during operation, and after a defined time interval, to discard this defined number completely. In this case there is no on-going, quasi-continuous following of the mass initialization, but rather, a discontinuous updating thereof.

According to a simplified procedure, the vehicle-specific maximum and minimum mass values used for initializing the mass of the motor vehicle after it has been restarted, can also be determined in such manner that after calculating a new mass value, this value is compared with the stored maximum value and with the stored minimum mass value. If the newly determined mass value is larger than the stored maximum mass value, the stored maximum mass value is replaced by the newly determined mass value. On the other hand, if the newly determined mass value is smaller than the stored maximum mass value, the stored maximum mass value is reduced by a fixed amount. If the newly determined mass value is smaller than the stored minimum mass value, the stored minimum mass value is replaced by the newly determined mass value. In contrast, if the newly determined mass value is larger than the stored minimum mass value, then the stored minimum mass value is increased by a fixed amount. The effect of this simplified procedure is that the stored maximum and minimum mass values remain updated at all times. If once, due to erroneous loading or calculation error, a wrong maximum or minimum mass value is stored, then this will be corrected automatically in the course of time. Thus, the maximum mass value or the minimum mass value always remain automatically within the range of actually occurring mass values.

In another advantageous further development of the method according to the invention, from the mass values M(t) determined and stored during operation, a vehicle-specific loading pattern or a vehicle-specific unloading pattern is determined for the motor vehicle. Here, for the case of the garbage collection truck or the milk delivery truck, which start from an unloaded condition and are loaded in several steps, the patterns determined from calculated and stored mass values M(t) and shown in FIGS. 2 and 3 are in each case loading patterns.

With a heating oil tanker, which begins from a maximally loaded condition and is unloaded in several steps, an unloading pattern would be produced.

According to this advantageous further development of the invention, the mass initialization after restarting by virtue of the above-described, vehicle-specific maximum mass value $M'_{INT,MAX}$ and the above-described vehicle-specific minimum mass value $M'_{INT,MIN}$ is adapted on the basis of the loading or unloading pattern determined. Thus, FIG. 3 shows that according to the advantageous further development of the invention, the vehicle-specific maximum mass value $M''_{INT,MAX}$ and the vehicle-specific minimum mass value $M''_{INT,MIN}$ are determined on the basis of the vehicle-specific loading pattern, which is determined from the calculated and stored mass values M(t). The maximum mass value $M'_{INT,MAX}$ determined independently of the loading or unloading pattern in this case constitutes an upper limit and the minimum mass value $M'_{INT,MIN}$ constitutes a lower limit.

Figure 3:
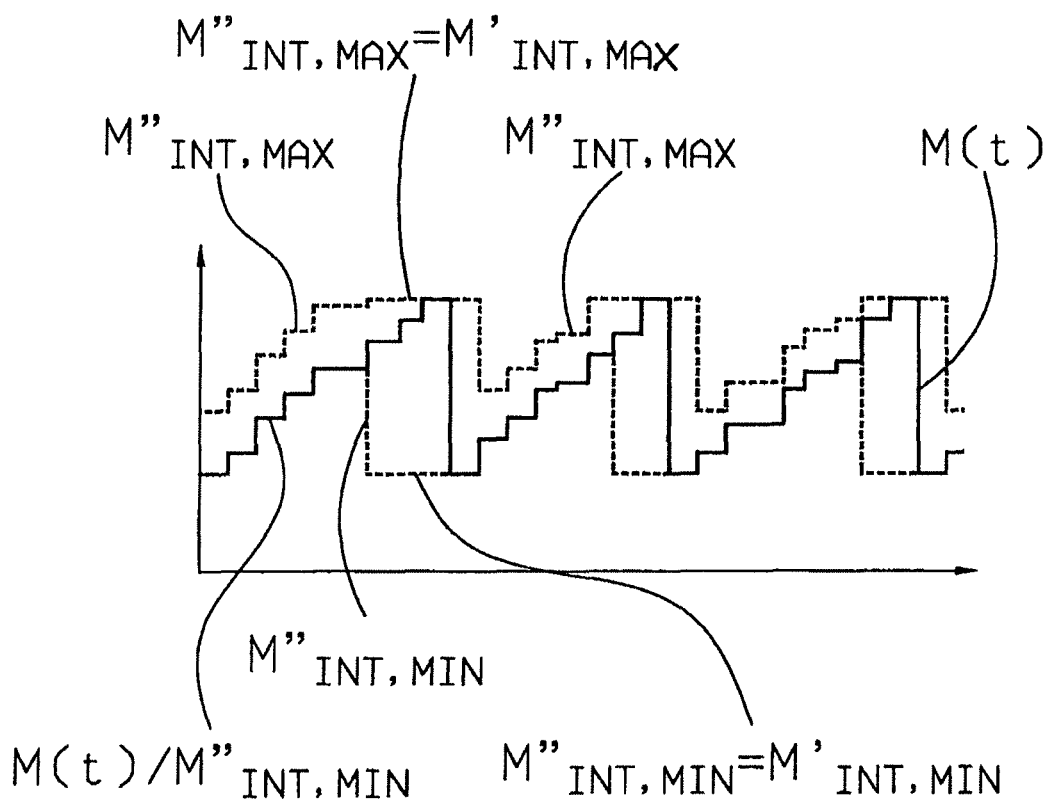
FIG. 3: A diagram to make clear a second example embodiment of the method according to the invention for initializing the mass of a motor vehicle.

Thus, according to FIG. 3, on the basis of the loading pattern determined the vehicle-specific maximum mass value $M''_{INT,MAX}$ and the vehicle-specific minimum mass value $M''_{INT,MIN}$ are determined in such manner that the maximum mass value $M''_{INT,MAX}$ and the minimum mass value $M''_{INT,MIN}$ are calculated on the basis of loading-pattern-dependent, anticipated mass offset values, in order to carry out the mass initialization after the restart of the motor vehicle in a loading-pattern-dependent and so still more accurate manner.

The most recently calculated or current mass value is set against an anticipated mass offset value that depends on the loading or unloading pattern, in order to determine the maximum mass value $M''_{INT,MAX}$ and the minimum mass value $M''_{INT,MIN}$ in a manner that depends on the loading or unloading pattern.

If the calculated or current mass value is smaller than a defined limit value, then in the loading pattern of FIG. 3 after a restart the loading-pattern-dependent minimum mass value $M''_{INT,MIN}$ corresponds approximately to the most recently calculated or current mass value and the loading-pattern-dependent maximum mass value $M''_{INT,MAX}$ corresponds approximately to the most recently calculated or current mass value plus a positive mass offset value, but is limited to the maximum mass value $M'_{INT,MAX}$ determined independently of the loading pattern. If a defined limit value is exceeded, then according to FIG. 3 the process begins from a previous unloading of the until then successively loaded motor vehicle, so that the loading-pattern-dependent minimum mass value $M''_{INT,MIN}$ corresponds to the minimum mass value $M'_{INT,MIN}$ determined independently of the loading pattern and the loading-pattern-dependent maximum mass value $M''_{INT,MAX}$ corresponds to the maximum mass value $M'_{INT,MAX}$ determined independently of the loading pattern.

In the case of an unloading pattern, the unloading-pattern-dependent maximum mass value $M''_{INT,MAX}$ and the unloading-pattern-dependent minimum mass value $M''_{INT,MIN}$ can be determined by analogy with FIG. 3, and if the calculated or current mass value is larger than a defined limit value, after a restart the maximum mass value $M''_{INT,MAX}$ corresponds approximately to the most recently calculated or current mass value and the minimum mass value $M''_{INT,MIN}$ corresponds approximately to the most recently calculated or current mass value plus a negative mass offset value, but is limited by the minimum mass value $M'_{INT,MIN}$ determined independently of the unloading pattern.

If the value falls below a defined limit value, in this case the process starts from a previous loading of the until then successively unloaded motor vehicle, so that the minimum mass value $M''_{INT,MIN}$ then corresponds to the minimum mass value $M'_{INT,MIN}$ and the maximum mass value $M''_{INT,MAX}$ to the maximum mass value $M'_{INT,MAX}$.

Accordingly, by virtue of the advantageous further development of the method according to the invention, the variation of the calculated mass value during operation is considered in order to determine a loading pattern or an unloading pattern. This is then taken into account in the mass initialization after restarting the motor vehicle. Thus, after restarting a motor vehicle its mass can be estimated more accurately, since in doing this the typical use of the motor vehicle is taken into account.

Thus, when a milk delivery truck or a garbage collection truck is parked while empty or with a low mass, after it is restarted one need not assume that it is fully laden, since from its determined loading pattern it can be assumed that it will be successively loaded.

Likewise, in the case of a heating oil transporter, which is successively unloaded, it need not be assumed that the vehicle will be fully unloaded from a condition of maximum load.

Rather, on the basis of the loading or unloading pattern determined, the maximum mass value and the minimum mass value for mass initialization after a restart can be determined from the current calculated mass value and an offset value that depends on the loading or unloading pattern.

The invention claimed is:

1. A method of initializing a mass of a motor vehicle, after a restart thereof, for controlling a starting process from a standstill of the motor vehicle, the method comprising the steps of:
   the motor vehicle computing the mass of the motor vehicle during the operation thereof;
   the motor vehicle storing mass values determined during operation of the motor vehicle;
   the motor vehicle determining at least one of a vehicle-specific maximum mass value and a vehicle-specific minimum mass value from the stored mass values; and
   the motor vehicle initializing the mass of the motor vehicle, after the motor vehicle is restarted, using the at least one of the determined vehicle-specific maximum mass value and the determined vehicle-specific minimum mass value.

2. The method according to claim 1, further comprising the step of the motor vehicle filtering out and avoiding rarely encountered maximum mass values for the determination of the vehicle-specific maximum mass value.

3. The method according to claim 1, further comprising the step of the motor vehicle filtering out and avoiding taking into account rarely encountered minimum mass values for the determination of the vehicle-specific minimum mass value.

4. The method according to claim 1, further comprising the steps of the motor vehicle taking into account a defined number of mass values stored in a digital ring storage system for the determination of the at least one of the vehicle-specific maximum mass value and the vehicle-specific minimum mass value and, when a new mass value is computed and stored in the ring storage system, deleting an oldest mass value in the ring storage system.

5. The method according to claim 1, further comprising the steps of the motor vehicle taking into account a defined number of stored mass values for the determination of the at least one of the vehicle-specific maximum mass value and the vehicle-specific minimum mass value, and discarding, after lapse of a defined time interval, all the stored mass values.

6. The method according to claim 1, further comprising the steps of the motor vehicle determining the vehicle-specific maximum mass value, by comparing a determined new mass value with the stored maximum mass value and, if the new determined mass value is larger than the stored maximum mass value, replacing the stored maximum mass value by the new determined mass value, whereas if the new determined mass value is smaller than the stored maximum mass value, reducing the stored maximum mass value by a fixed amount.

7. The method according to claim 1, further comprising the steps of the motor vehicle determining the vehicle-specific minimum mass value, by comparing a determined new mass value with the stored minimum mass value, and if the new determined mass value is smaller than the stored minimum mass value, replacing the stored minimum mass value by the new determined mass value, whereas if the new determined mass value is larger than the stored minimum mass value, increasing the stored minimum mass value by a fixed amount.

8. The method according to claim 1, further comprising the step of the motor vehicle determining either a vehicle-specific loading pattern or a vehicle-specific unloading pattern for the motor vehicle from the stored mass values.

9. The method according to claim 8, further comprising the step of the motor vehicle determining at least one of a vehicle-specific maximum mass value that depends on either the loading or the unloading pattern and a vehicle-specific minimum mass value that depends on either the loading or the unloading pattern on a basis of the either vehicle-specific loading or the unloading pattern.

10. The method according to claim 9, further comprising the steps of the motor vehicle determining at least one of the vehicle-specific maximum mass value that depends on either the loading or the unloading pattern and the vehicle-specific minimum mass value that depends on either the loading or the unloading pattern on the basis of the either vehicle-specific loading or the unloading pattern in such manner that to determine the at least one of the vehicle-specific maximum mass value that depends on either the loading or the unloading pattern and the vehicle-specific minimum mass value that depends on either the loading or the unloading pattern, either correcting a most recently calculated or a current mass value by an anticipated mass offset value that depends on the either loading or the unloading pattern.

11. The method according to claim 9, further comprising the step of constituting the maximum mass value determined independently of the loading or unloading pattern as an upper limit for the vehicle-specific maximum mass value determined in a manner dependent on the either of the loading or the unloading pattern.

12. The method according to claim 9, further comprising the steps of constituting the minimum mass value determined independently of the either of the loading or unloading pattern as a lower limit for the vehicle-specific minimum mass value determined in a manner dependent on the loading or unloading pattern.

13. The method according to claim 1, further comprising the step of the motor vehicle always automatically maintaining the maximum mass value and the minimum mass value within a range of actually occurring mass values.

14. The method according to claim 1, further comprising the step of the motor vehicle substantially continuously updating at least one of the vehicle-specific maximum mass value and the vehicle-specific minimum mass value for the initialization of the motor vehicle mass.

15. The method according to claim 1, further comprising the step of controlling the starting process of the motor vehicle, from a standstill of the motor vehicle, based on the initialized mass of the motor vehicle.

16. A method of initializing a mass of a motor vehicle, after a restart thereof, for controlling a starting process from a standstill of the motor vehicle, the method comprising the steps of:
   computing the mass of the motor vehicle during the operation thereof;
   storing mass values determined during operation of the motor vehicle;
   determining at least one of a vehicle-specific maximum mass value and a vehicle-specific minimum mass value from the stored mass values; and
   initializing the mass of the motor vehicle, after the motor vehicle is restarted, using the at least one of the determined vehicle-specific maximum mass value and the determined vehicle-specific minimum mass value; and
   controlling a starting process of the motor vehicle from a standstill of the motor vehicle based on the initialized mass of the motor vehicle.

17. The method according to claim 16, further comprising the step of one of determining a starting gear and controlling a starting clutch based upon the initialized mass of the motor vehicle.

* * * * *